United States Patent [19]
Niwa

[11] Patent Number: 4,730,868
[45] Date of Patent: Mar. 15, 1988

[54] SLIDING ROOF FOR AUTOMOBILES

[75] Inventor: Toshiaki Niwa, Saitama, Japan

[73] Assignee: Honda Giken Kogyo Kabushiki Kaisha, Tokyo, Japan

[21] Appl. No.: 890,975

[22] Filed: Jul. 30, 1986

Related U.S. Application Data

[63] Continuation of Ser. No. 510,336, Jul. 1, 1983, abandoned.

[30] Foreign Application Priority Data

Jul. 2, 1982 [JP] Japan .................................. 57-115271

[51] Int. Cl.⁴ .......................... B60J 7/047; B60J 7/057
[52] U.S. Cl. ..................................... 296/216; 296/220; 296/223
[58] Field of Search ............................... 296/216–218, 296/220–223

[56] References Cited

U.S. PATENT DOCUMENTS 4,407,541 10/1983 Boots .................................... 296/216
4,463,983 8/1984 Hellriegel ............................ 296/213

FOREIGN PATENT DOCUMENTS 2532187 2/1977 Fed. Rep. of Germany ...... 296/220
3129900 2/1983 Fed. Rep. of Germany ...... 296/222
2495067 6/1982 France ................................ 296/222
2068304 8/1981 United Kingdom ................ 296/216
2090630 7/1982 United Kingdom ................ 296/222

*Primary Examiner*—Dennis H. Pedder
*Attorney, Agent, or Firm*—Irving M. Weiner; Joseph P. Carrier; William D. Blackman

[57] ABSTRACT

A sliding roof in which a panel for closing and opening a roof opening is supported with front and rear stays slidable through guides. The front stay is slidable along a first guide provided on a roof frame, and the rear stay is interposed between the first guide and a second guide provided on the underside surface of the panel, so as to be slidable relative to at least either guide. At least one of the front stay, the rear stay and the first guide are formed such that, as the front stay approaches the rear stay with the panel caused to move rearwardly of the vehicle body, a support point of the front stay supporting the panel is raised to be higher relative to a support point of the rear stay supporting the panel.

16 Claims, 24 Drawing Figures

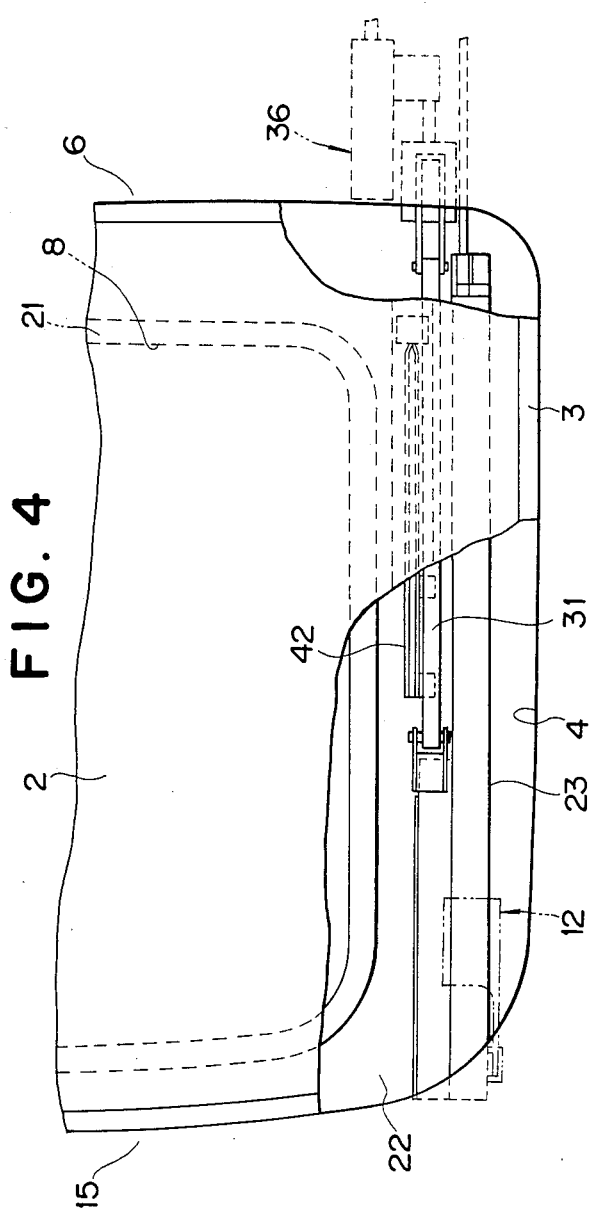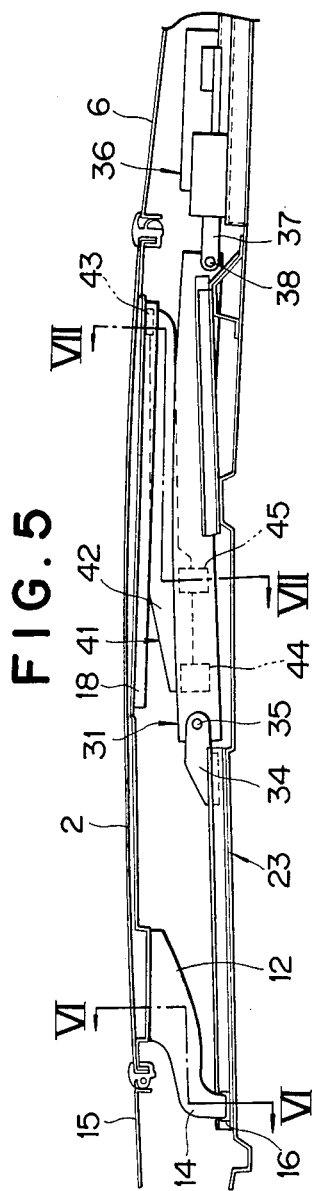

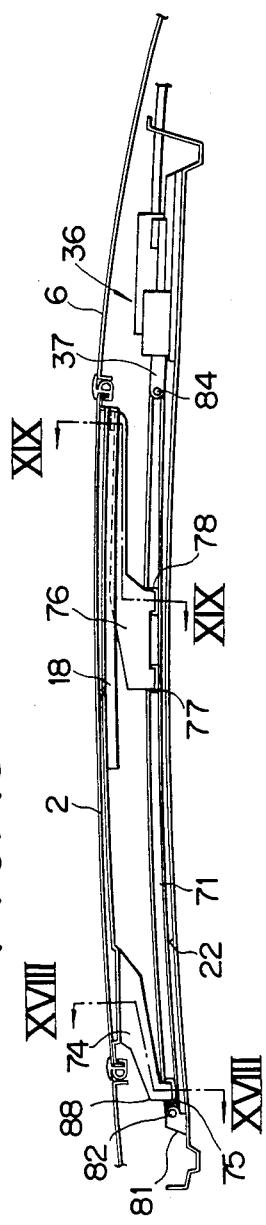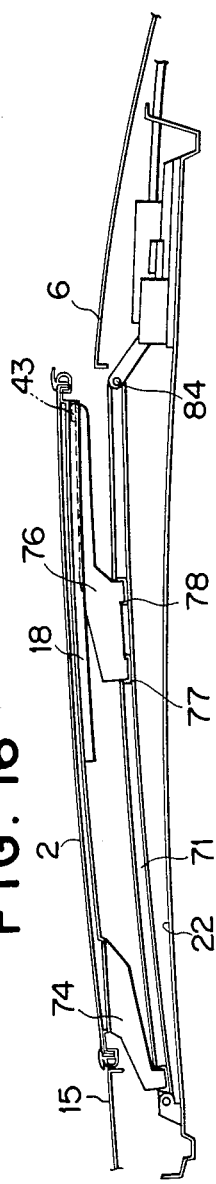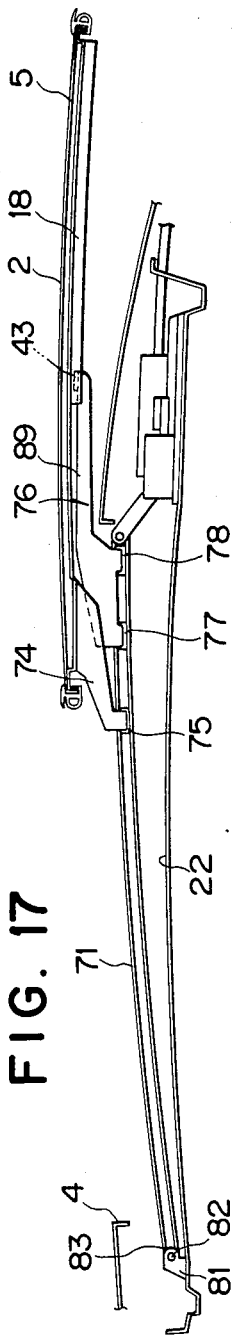

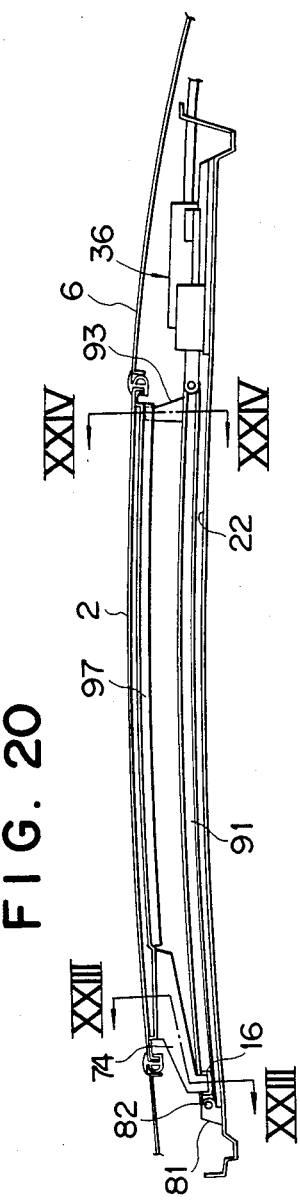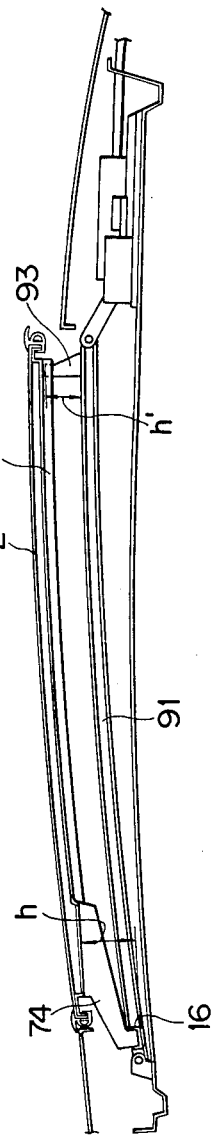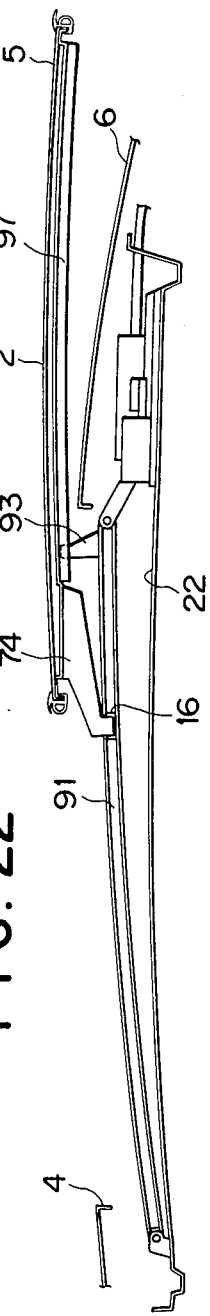

SLIDING ROOF FOR AUTOMOBILES

This is a continuation of application Ser. No. 510,336, filed July 1, 1983, abandoned.

BACKGROUND OF THE INVENTION

1. Field of the Invention

The present invention relates generally to a sliding roof for vehicles. Particularly, the invention relates to a sliding roof for vehicles of the type in which a slidable panel slides outwardly and rearwardly of a roof opening.

2. Description of Relevant Art

In a sliding roof for vehicles of the type in which, to open a roof opening, a slidable panel is caused to have the rear part thereof raised from the roof opening and then slide over the rear part of the roof of the vehicle, it has been desired that when the roof opening is open the slidable panel becomes substantially horizontal with its inclination angle relatively small, whereas, as the inclination angle of the sliding roof becomes large, the wind pressure resistance of the vehicle increases during travel, thus increasing the fuel consumption rate and wind noise level, and resulting in other disadvantages.

Moreover, when the roof opening is opened, the slidable panel is required to be firmly and strongly supported.

There have been proposed sliding roofs which take the foregoing features into consideration, for example, the one proposed in UK patent Application GB No. 2,068,304 A in which a screw telescope, expandable and contractible by means of a threaded cable, is arranged substantially upright on a roof frame at the rear part of a roof opening and, to open the roof opening, a slidable panel is caused to have the rear part thereof raised upwardly with the screw telescope and moved rearwardly, while with the rearward movement of the slidable panel the screw telescope is driven to contract so as to minimize the inclination angle of the sliding panel.

However, using the combination of the screw telescope and the threaded cable, this known sliding roof has a complex structure, thus failing to simplify assembly work and reduce costs of manufacture. Moreover, the upright arrangement of the screw telescope accompanies a sliding mechanism projecting inwardly of the passenger area to a relatively large extent. Further, besides other problems, when the roof opening is fully opened, the supporting of the slidable panel becomes frontwardly one-sided, thus failing to secure the stability at the rear trailing end of the slidable panel.

SUMMARY OF THE INVENTION

According to the present invention, there is provided a sliding roof for vehicles, comprising a panel for closing a roof opening, a roof frame defining the roof opening, a guide mechanism for guiding the panel slidably in the longitudinal direction of the vehicle body, the guide mechanism being provided on the roof frame, an actuator for actuating the panel, front and rear stays slidably supporting the panel through the guiding mechanism, and a tilt-up mechanism for tilting up the panel at the rear end thereof. The tilt-up mechanism is provided near the rear end of the roof opening on the roof frame, the guide mechanism has a first guide provided on the roof frame and a second guide provided on the panel, the front stay is slidable guidedly with the first guide, and the rear stay is arranged between the first and second guides so as to be slidable relative to at least either thereof. At least one of the front and rear stays and the first guide is formed such that, as the front stay approaches the rear stay with the panel caused to move rearwardly of the vehicle body, a point of the front stay supporting the panel is raised to be higher relative to a point of the rear stay supporting the panel.

Accordingly, an object of the present invention is to provide a sliding roof for vehicles, in which a slidable panel of an open roof opening has its inclination angle minimized by means of a unique combination structure using guide rails and panel supporting stays and, thus, has a simplified construction and can be produced at a low cost.

Another object of the invention is to provide a sliding roof for vehicles, in which an essential mechanism portion has its extent of projection into the passenger area of the vehicle minimized.

Still another object of the invention is to provide a sliding roof for vehicles, in which the supporting of a slidable panel when a roof opening is fully opened can be effected more strongly and firmly than in conventional cases.

The above and further features and objects of the present invention will become more fully apparent from the following detailed description of the preferred embodiments of the invention when the same is read in conjunction with the accompanying drawings.

BRIEF DESCRIPTION OF THE ACCOMPANYING DRAWINGS

FIG. 4 is a partial plan view of the sliding roof in accordance with a first embodiment of the invention, with the slidable panel partially broken away.

FIGS. 15, 16 and 17 are sectional views of the sliding roof in accordance with a third embodiment of the invention, with the slidable panel closed, raised at the rear part thereof and moved to the rear stroke end thereof, respectively.

FIGS. 20, 21 and 22 are sectional views of the sliding roof in accordance with a fourth embodiment of the invention, with the slidable panel closed, raised at the rear part thereof and moved to the rear stroke end thereof, respectively.

DETAILED DESCRIPTION OF THE INVENTION

Figure 3:
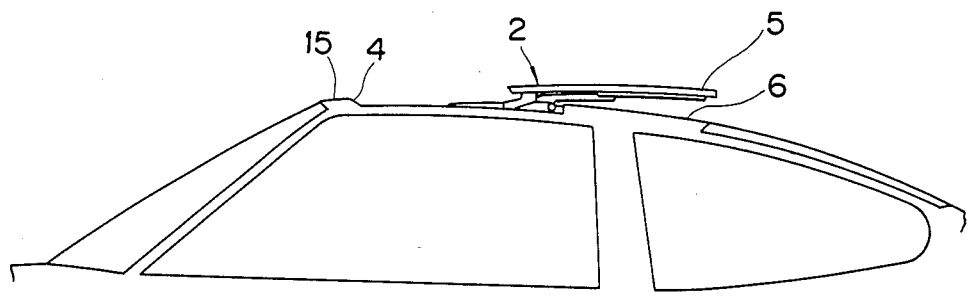
FIG. 3 is a view similar to FIG. 1, with the slidable panel moved to the rear stroke end thereof.

Referring first to FIGS. 1 to 4, designated by reference numeral 1 is a roof of a vehicle. The roof 1 is formed therethrough with an opening 4 closable with a slidable panel 2 which has along the peripheral edge thereof a seal member 3 fitted thereon. To open the roof opening 4, the panel 2 is raised at its rear part 5 (FIG. 2) and moved toward the rearmost position of a rear fixed roof 6 of the vehicle (FIG. 3). At this time, an opening 8 (FIG. 4) formed through a lining 7 of the roof 1 concurrently opened, permitting a passenger area of the vehicle to communicate with the open air through the openings 4 and 8.

Figure 5:
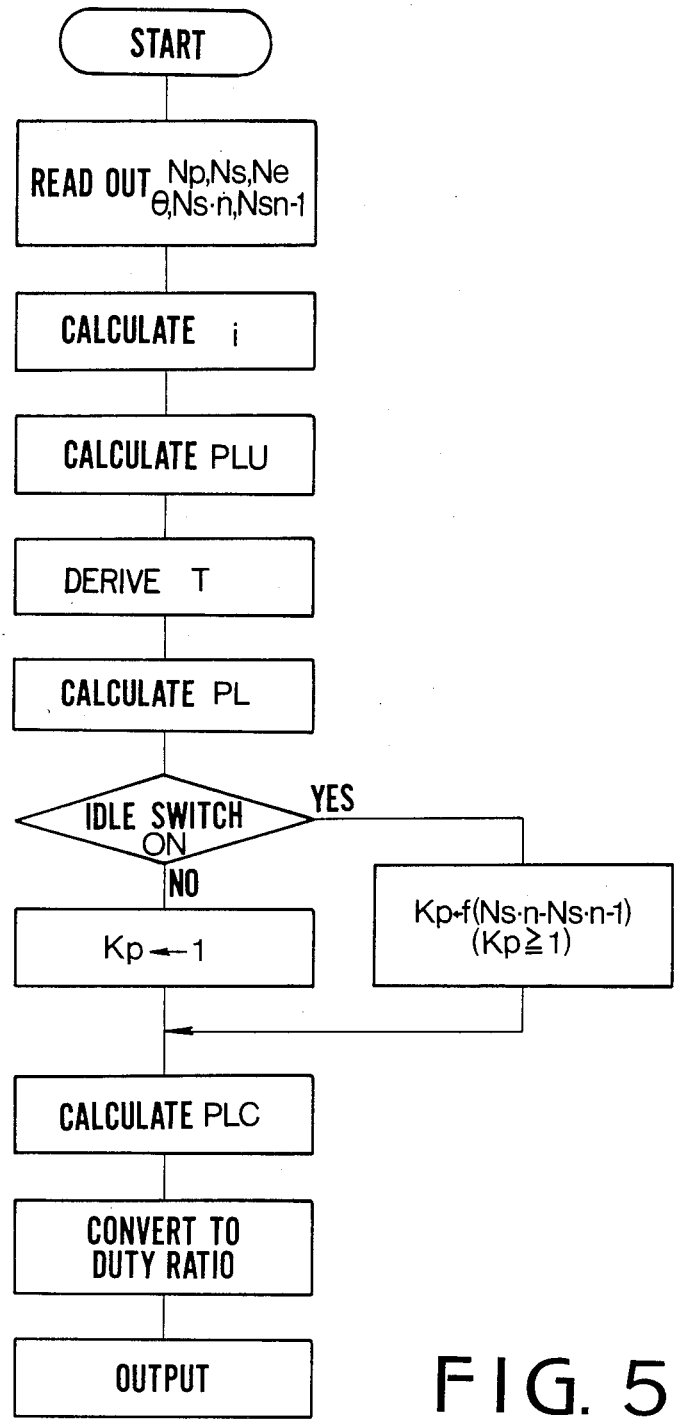
FIG. 5 is a sectional view of the embodiment of FIG. 4, with the slidable panel closed.
Figure 6:
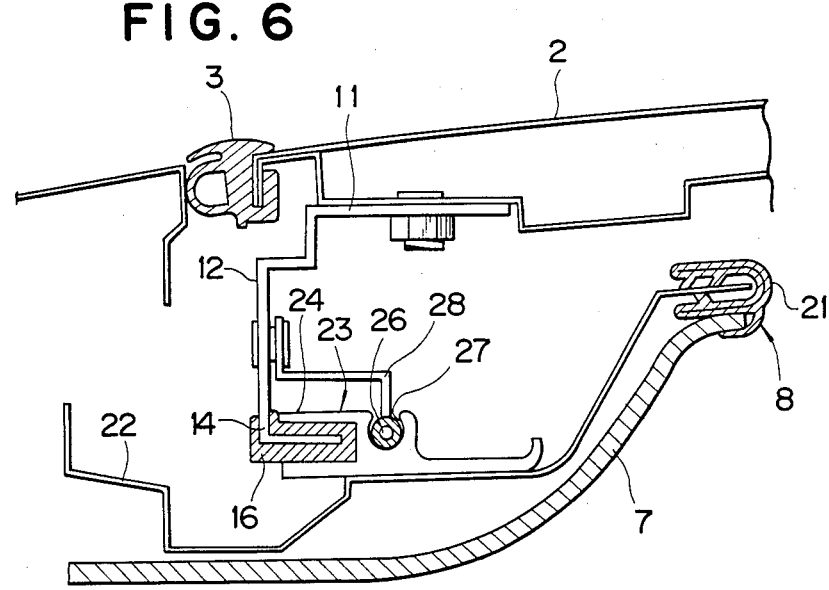
FIG. 6 is a sectional view taken along line VI—VI of FIG. 5.

Referring now to FIGS. 5 and 6, on both sides of the front end of the underside surface of the panel 2, there is provided either of a pair of front stays 12 depending downwardly therefrom while having their flanged upper ends 11 secured to the panel 2 and their lower ends 14 provided with either of a pair of sliders 16. Each front stay 12 has a form extending, between the flanged upper end 11 to the lower end 14, forwardly relative to the body of the vehicle and projecting, at the lower end 14, forwardly of the front part of the panel 2 so that, while the panel 2 is in its closed position, the lower end 14 is disposed under a front fixed roof 15 of the vehicle.

Figure 7:
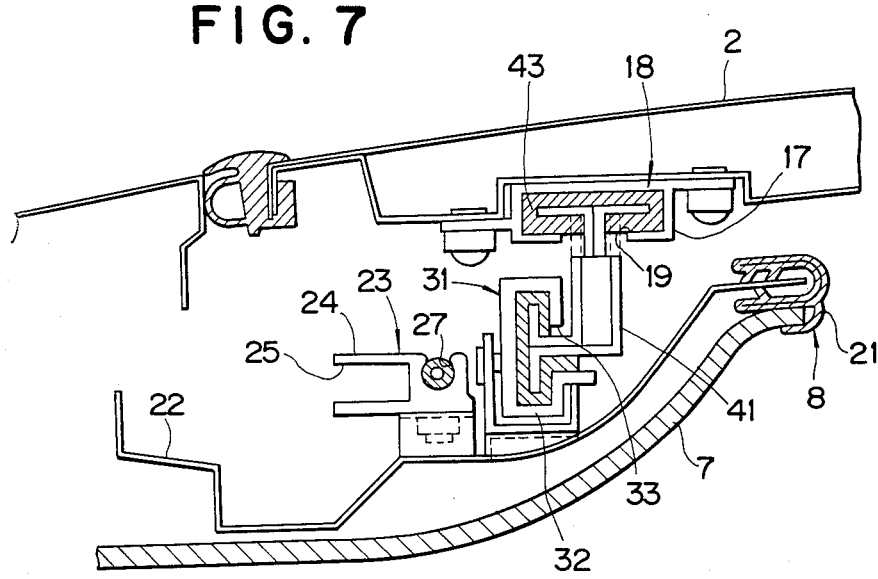
FIG. 7 is a sectional view taken along line VII—VII of FIG. 5.

As shown in FIGS. 5 and 7, the panel 2 is provided on the underside surface thereof, along a rearward intermediate part thereof, with a pair of subguide rails 18 disposed respectively on both sides thereof, the sub-guide rails 18 being each formed with a guide slot 19 opened downwardly.

The opening 8 in the roof lining 7 is provided around the peripheral edge thereof with a trim member 21 fitted thereon and, over the roof lining 7, there are disposed a pair of sheet-like frame members 22 having their inner ends held by the trim member 21, the frame member 22 being disposed under respective sides of the panel 2.

On the frame members 22, there is fixed either of a pair of main guide rails 23 extending in a straight manner from the front part of the roof opening 4 to the rear part thereof. Each main guide rail 23 has a guide portion 24 shaped in its section in the form of a channel defining a groove 25 directed transversely outwardly of the vehicle body and is extended at the front end part thereof to underlie the front fixed roof 15, while being forwardly inclined as a whole with the rear part thereof positioned at a higher level than the front part thereof. The guide portion 24 of each main guide rail 23 is formed in its transversely inward portion with a guide slot 27 for slidably guiding a drive cable 26 which is connected through a fitting 28 to the front stay 12, as shown in FIG. 6.

Figure 8:
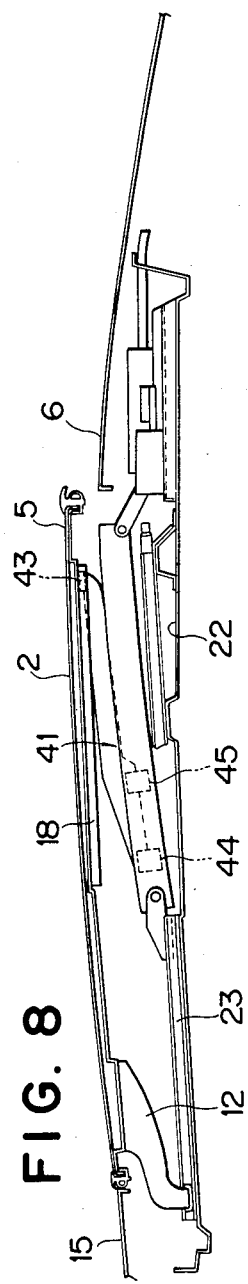
FIG. 8 is a sectional view similar to FIG. 5, with the slidable panel raised at the rear part thereof.
Figure 9:
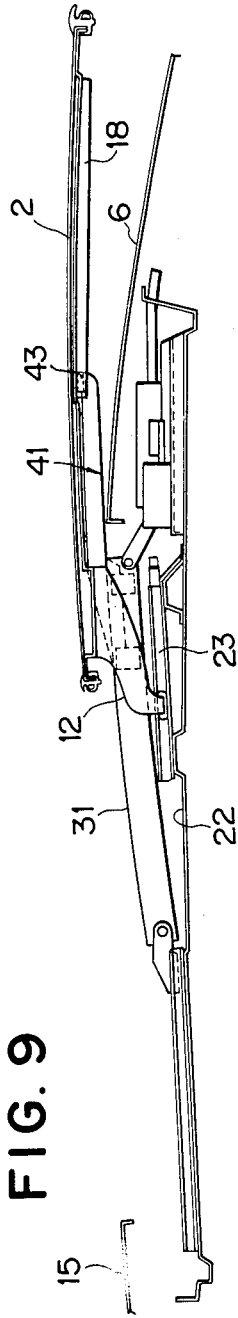
FIG. 9 is a sectional view similar to FIGS. 5 and 8, with the slidable panel moved to the rear stroke end thereof.

In the guide portion 24 of each main guide rail 23, there is fitted a slider 16 which is adapted to be slidable therealong and rotatable for a predetermined angle range to thereby cause the panel 2 to be tilted up or raised at the rear part 5. As shown in FIGS. 8 and 9, the panel 2 is adapted to be slidable with the front stay 12 over the rear fixed roof 6 when the drive cable 26 is moved rearwardly from the state thereof as the panel 2 is raised at the rear part 5. In the fully closed state of the panel 2 shown in FIG. 5, the lower end 14 of the front stay 12 is located under the front fixed roof 15 and the slider 16 is at the front end part of the main guide rail 23, while in a fully opened state thereof shown in FIG. 9 the slider 16 is brought near the rear end part of the main guide rail 23.

On each frame member 22, at the transversely inward side of the guide portion 24 of the main guide rail 23, there is mounted a sub-guide rail 31 at the side of the frame member 22 corresponding to the sub-guide rail 18 at the side of the panel 2, the sub-guide rail 31 extending between a substantially intermediate part thereof.

The frame side sub-guide rail 31 has a guide portion 32 formed therein with a slot 33 opened inwardly of the vehicle body and, as shown in FIG. 5, is pivotably connected at the front end part thereof to a support shaft 35, which is supported by a hinge arm 34 secured to the substantially intermediate part of the frame member 22 at either transverse side thereof, and at the rear end part thereof through a support shaft 38 to a drive lever 37 of a tilt-up mechanism 36, which is disposed under the rear fixed roof 6 at either transverse side thereof.

Figure 10:
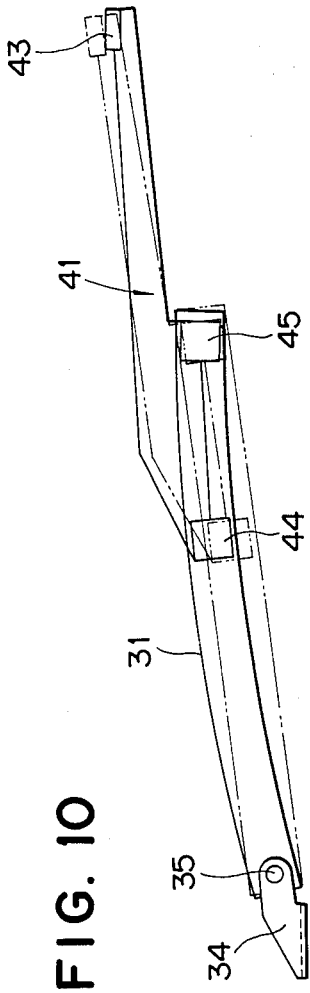
FIG. 10 is an explicative view of the functional relation between a rear slide stay and a guide rail therefor.
Figure 11:
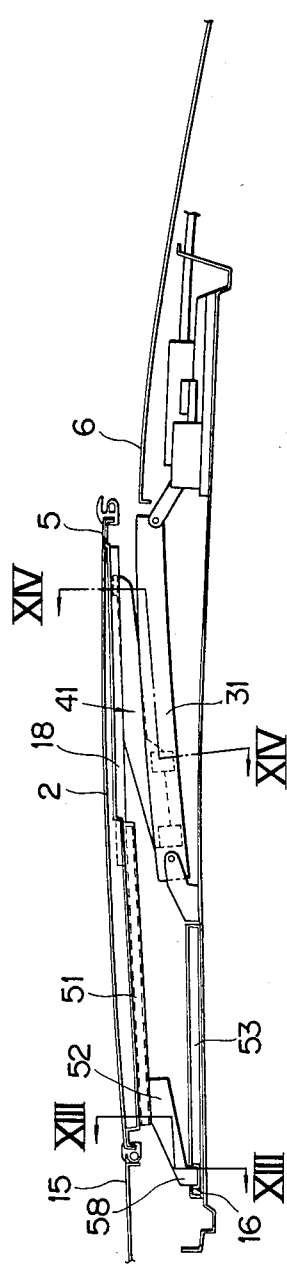
FIGS. 11 and 12 are sectional view of the sliding roof in accordance with a second embodiment of the invention, with the slidable panel raised at the rear part thereof and moved to the rear stroke end thereof, respectively.

As shown in FIG. 10, the sub-guide rail 31 is arcuately formed to be slightly convexed upwardly, and adapted to be vertically swingable about the shaft 35, following the drive lever 37, when lever 37 is vertically rotated with tilt-up mechanism 36.

Between the panel side sub-guide rail 18 and the frame side sub-guide rail 31, there is slidably fitted a rear stay 41 extending longitudinally of the vehicle body, the rear stay 41 being provided on the upper side of the rear part thereof with a slider 43 slidably fitted in a guide portion 17 of the panel side sub-guide rail 18 and on the lower side of the front part thereof with a pair of sliders 44, 45 spaced from each other longitudinally of the vehicle body and both slidably fitted in the guide portion 32 of the frame side sub-guide rail 31. In other words, the rear stay 41 is operatively connected to an intermediate portion, in the longitudinal direction of the vehicle body, of the panel 2 through the panel side sub-guide rail 18, and is slidably connected to the frame side sub-guide rail 31. The vertical distance between the upper slider 43 and the lower sliders 44, 45, that is the height of the rear stay 41, is predetermined to be smaller than that between the slider 16 and the panel 2, that is, the height of the front stay 12.

In the fully closed state of the panel 2 shown in FIG. 5, the upper slider 43 is located in the rear end part of the panel side sub-guide rail 18 and the lower front slider 44 is located in the front end part of the frame side sub-guide rail 31. In the fully opened state of the panel 2 shown in FIG. 9, in which the rear stay 41 is brought over the rear fixed roof 6, the upper slider 43 is positioned in the front end part of the panel side sub-guide rail 18 and the lower rear slider 45 is positioned in the rear end part of the frame sub-guide rail 31.

In the above arrangement, the sliders 43, 44, 45 and the guide portions 17, 32 are so arranged that, with the longitudinal movement of the panel 2, the rear stay 41 also moves longitudinally of the vehicle body. Namely, the rearward movement of the rear stay 41 may be such that at first only the panel 2 moves rearwardly from the state shown in FIG. 8 and in due course the panel side sub-guide rail 18 engages at the front end part thereof with the upper slider 43 before the rear stay 41 starts moving rearwardly integrally with the panel 2, or such that the rear stay 41 moves rearwardly integrally with the panel 2 from the initial point and in due course the lower rear slider 45 engages with the rear end part of the frame side sub-guide rail 31 before the upper slider 43 slides along the panel side sub-guide rail 18, thereby permitting only the panel 2 to move rearwardly. Moreover, the rear stay 41 may move rearwardly, sequentially following the rearward movement of the panel 2.

There will be described hereinbelow the function and effect of the sliding roof in accordance with the first embodiment of the invention.

Figure 1:
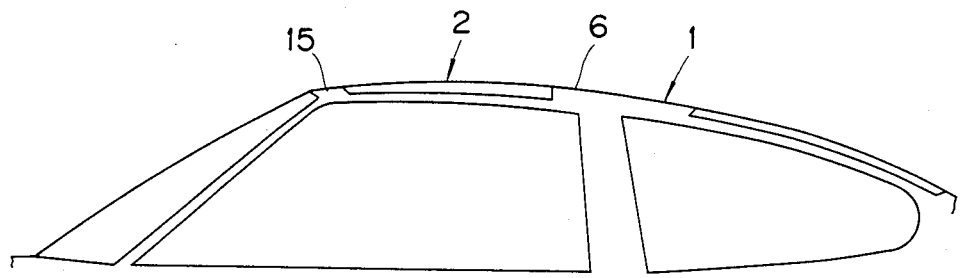
FIG. 1 is a schematic side view of an upper portion of a vehicle provided with a sliding roof according to the invention, with a slidable panel closed.
Figure 2:
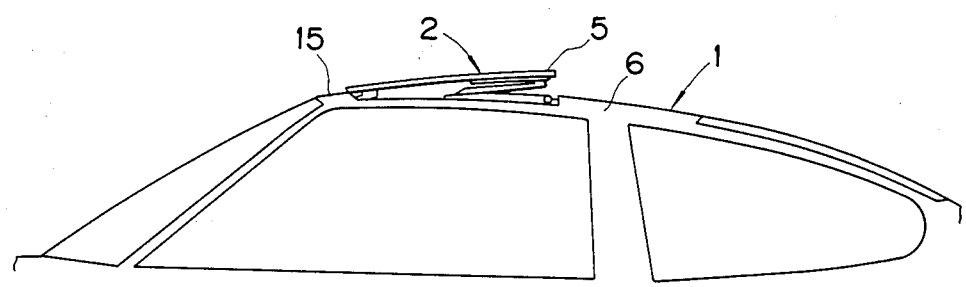
FIG. 2 is a view similar to FIG. 1, with the slidable panel raised at the rear part thereof.

First of all, to fully open the panel 2, when from the fully closed state of the panel 2 shown in FIGS. 1 and 5 the drive lever 37 is driven to turn upwardly with the tilt-up mechanism 36, the frame side sub-guide rail 31 will swing upwardly about the support shaft 35 as a fulcrum, thereby causing the rear part 5 of the panel 2 to be tilted up or raised with the rear stay 41, whereas the tilt-up action of the rear part 5 of the panel 2 is rendered smooth with the slider 16 fixed to the front stay 12, which slider 16 is fitted in the guide portion 24 of the main guide rail 23 so as to be rotatable for the predetermined angle range as mentioned hereinabove.

Then, when a cable actuator (not shown) is operated to have the drive cable 26 move rearwardly, the rearward movement of the drive cable 26 will be transmitted through the front stay 12 to the panel 2, thereby causing the slider 16 fixed to the front stay 12, the slider 43 fixed to the rear part of the rear stay 41 and the sliders 44, 45 fixed to the front part of the rear stay 41 to slide along the guide portion 24 of the main guide rail 23, the guide portion 17 of the panel side sub-guide rail 18 and the guide portion 32 of the frame side sub-guide rail 31, respectively, thus carrying the panel 2 toward the rear fixed roof 6.

As the panel 2 moves rearwardly, the rear stay 41 will also move rearwardly, while with the rearward movement of the rear stay 41, the height of which is predetermined to be less than the height of the front stay 12 in addition to that the frame side sub-guide rail 31 is arcuately formed to be slightly convexed upwardly, the inclination of the rear stay 41 will be gradually increased. Thus, a support point of the front stay 12 supporting the panel 2 is caused to be raised or rendered higher relative to a supporting point of the rear stay 41 supporting the panel 2, with the result that, as shown in FIGS. 9 and 10, in the fully opened state of the panel 2, the rear stay 41 has a substantially horizontal position, thus rendering the angle the panel 2 makes with the rear fixed roof 6 as small as possible. At this time, the panel 2 is firmly supported at both sides of the front end part thereof with the paired front stays 12 and at both sides of the intermediate part thereof with the paired rear stays 41.

On the contrary, to close the roof opening 4, when the cable actuator is operated to have the drive cable 26 move forwardly, the forward movement of the drive cable 26 will be transmitted through the front stay 12 to the panel 2, thereby causing the sliders 16, 43, 44, 45 to permit the panel 2 and the rear stay 41 to move forwardly so that, as shown in FIG. 8, the panel 2 is brought over the roof opening 4.

Then, when the tilt-up mechanism 36 drives the drive lever 37 to turn downwardly, the frame side sub-guide rail 31 will swing downwardly about the support shaft 35 as a fulcrum, thereby putting away the rear stay 41 and the frame side sub-guide rail 31 under the panel 2, to close the roof opening 4 with the panel 2.

In the above first embodiment of the invention, in which the sub-guide rail 31 has an arcuate form convexed upwardly, the distance between the front stay 12 and the rear stay 41 becomes smaller as the panel 2 slides over the rear fixed roof 6. Accordingly, the inclination of the panel 2 relative to the rear fixed roof 6 will be kept small to a considerable degree even in a modified example in which the frame side sub-guide rail 31 may be straight, assuming no more than that the rear stay 41 has its height predetermined to be smaller than the height of the front stay 12.

With respect to such this example, a similar effect will be obtainable even in a further modification in which the height of the front stay 12 may be equal to or smaller than that of the rear stay 41, provided that the main guide rail 23 has its fixing position raised as a whole relative to the frame member 22.

Referring now to FIGS. 11 to 14 showing the sliding roof according to a second embodiment of the invention, a panel 2 is provided at both sides on the underside surface thereof with either of a pair of front guide rails 51 extending along a forward intermediate part of the panel 2 and a front stay 52 is slidably fitted between each front guide rail 51 and either of a pair of main guide rails 53, whereas the second embodiment is distinctive in these points from the first embodiment.

Figure 13:
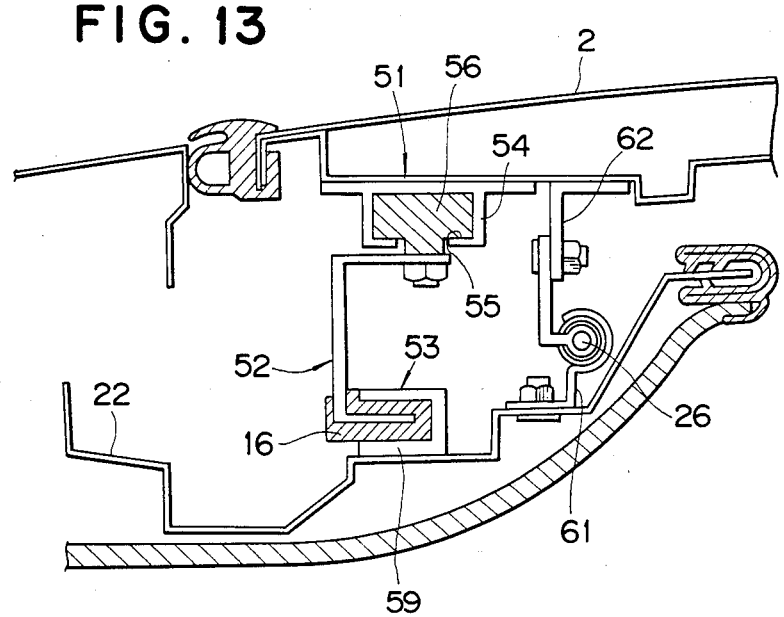
FIGS. 13 and 14 are sectional views taken along lines XIII—XIII and XIV—XIV of FIG. 11, respectively.
Figure 14:
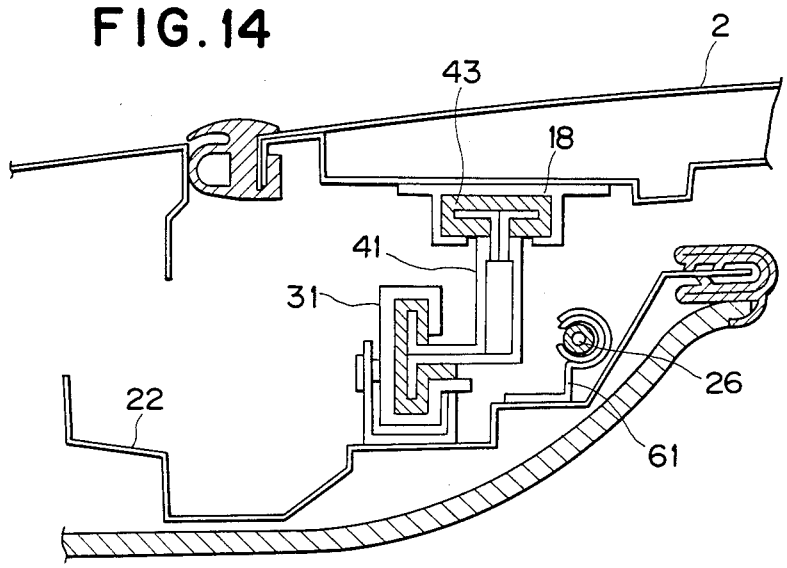

Each front guide rail 51 has a guide portion 54 formed therein with a guide slot 55, and the front stay 52 is provided with an upper slider 56 formed to be of substantially the same length as the front guide rail 51 and slidably fitted in the guide slot 55 of the front guide rail 51 as shown in FIG. 13. The front stay 52 is so formed as to extend forwardly from under the front end part of the upper slider 56 and is adapted, when closing the panel 2 to have its lower end part 58 put under a front fixed roof 15 of the vehicle, the lower end part 58 being provided with a slider 16, similar to that of the first embodiment, fitted in the main guide rail 53.

Moreover, the front stay 52 is adapted to be slidable between the front guide rail 51 and the main guide rail 53, thus rendering the length of the main guide rail 53 equal to the distance between the front part of a roof opening 4 to a substantially intermediate part thereof and the position thereof substantially parallel with a frame member 22. The frame member 22 is provided thereon, in its transversely inward part relative to the main guide rail 53, with a guide piece 61 for guiding a drive cable 26 which is secured at the end thereof to support piece 62 depending downwardly from the underside surface of the panel 2, thereby permitting the panel 2 to move longitudinally of the vehicle with the drive cable 26.

Figure 12:
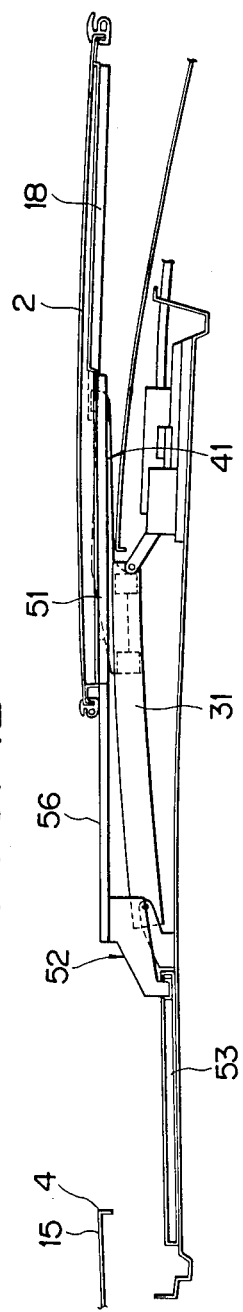

Further, the front stay 52 is so arranged that, when the roof opening 4 is closed with the panel 2, the lower slider 16 comes in the front end part of the main guide rail 53 and the upper slider 56 extends along substantially the total length of the guide slot 55 of the front guide rail 51. As shown in FIG. 12, in the state in which the panel 2 is moved over a rear fixed roof 6 of the vehicle, the lower slider 16 is located in the rear end part of the main guide rail 53 and the upper slider 56 is engaged at the rear end part thereof with an engagement portion (not shown) formed in the front end part of the front guide rail 51.

In this second embodiment, the lower and upper sliders 16, 56 and the main and front guide rails 53, 51 are so arranged that, with the longitudinal movement of the panel 2, the front stay 52 also moves longitudinally of the vehicle. Namely, the rearward movement of the front stay 52 may be such that at first only the panel 2 moves rearwardly from the state shown in FIG. 11 and in due course the upper slider 56 engages at the rear end part thereof with the engagement portion in the front end part of the front guide rail 51 before the front stay 52 starts moving rearwardly integrally with the panel 2, or such that the front stay 52 moves rearwardly integrally with the panel 2 from the initial point and in due course the lower slider engages with the rear end of the main guide rail 53 before the upper slider 56 slides along the front guide rail 51, thereby permitting only the panel 2 to move rearwardly. Further, the front stay 52 may move rearwardly, sequentially following the rearward movement of the panel.

Relative to the first embodiment of the invention, the above-described second embodiment thereof; is similar in that, with the rearward movement of panel 2, a rear stay 41 moves rearwardly guidedly with a frame side sub-guide rail 31 while being gradually inclined and, in the fully opened state of the panel 2, becomes substantially horizontal, thus rendering small the angle the panel 2 makes with the rear fixed roof 6, and the panel 2 is firmly supported at the front end part thereof and the intermediate part thereof with the front stay 52 and the rear stay 41, respectively. The second embodiment is distinctive in that as well as the rear stay 41 the front stay 52 is also caused to slide, thus rendering the longitudinal movement of the panel 2 smoother and the length of the main guide rail 53 is rendered equal to the distance between the front part of the roof opening 4 to a substantially intermediate part thereof, thus enabling placement of the main guide rail 53 and the frame side sub-guide rail 31 on the same straight line, thereby permitting the width of the device at both sides of the roof opening 4 to be reduced, with resultant advantages such as the possible expansion of the opening width.

Referring now to FIGS. 15 to 19 showing the sliding roof according to a third embodiment of the invention, a pair of main guide rails 71 arcuately formed to be slightly convexed upwardly are arranged on a roof frame 22 so as to extend at both sides of a roof opening 4 from the front part of the roof opening 4 to the rear part thereof and adapted to be swingable with a tilt-up mechanism 36, thus eliminating frame side sub-guide rails, while in these points the third embodiment is different from the first embodiment.

Each main guide rail 71 has a guide portion 72 shaped in its section in the form of a channel defining a slot 73 directed transversely outwardly of the vehicle, in which slot 73 a slider 75 fixed to the lower end of a front stay 74 and a pair of sliders 77, 78 fixed to the lower end of a rear stay 76 are slidably fitted, respectively.

The main guide rail 71 is pivotably connected at its front end part 83 to a support shaft 82, which is supported with a hinge arm 81 secured to a frame member 22 at either side of the front part of the roof opening 4, and at the rear end part thereof through a support shaft 84 to a drive lever 37 of a tilt-up mechanism 36, and is adapted so as to vertically swing about the support shaft 82 as a fulcrum, following the drive lever 37, with lever 37 is driven to vertically turn by the tilt-up mechanism 36.

Figure 18:
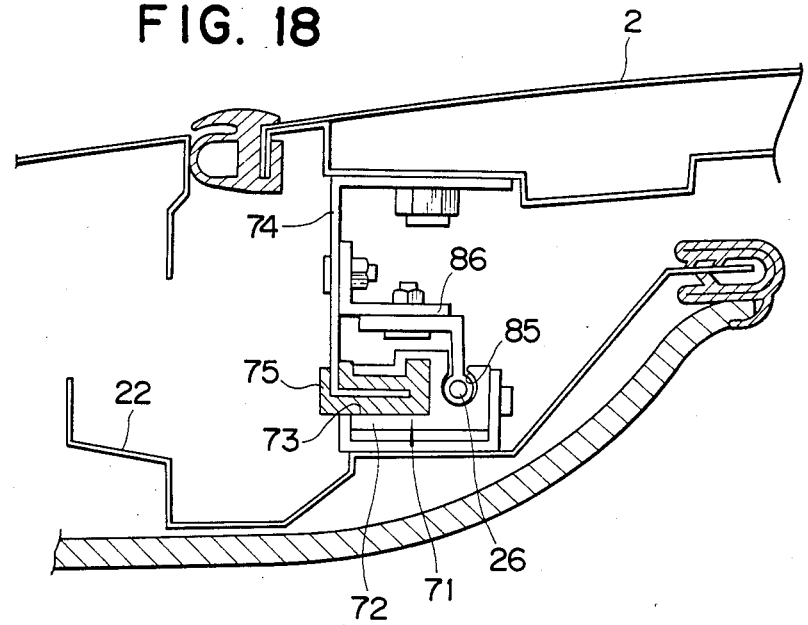
FIGS. 18 and 19 are sectional views taken along lines XVIII—XVIII and XIX—XIX of FIG. 15, respectively.
Figure 19:
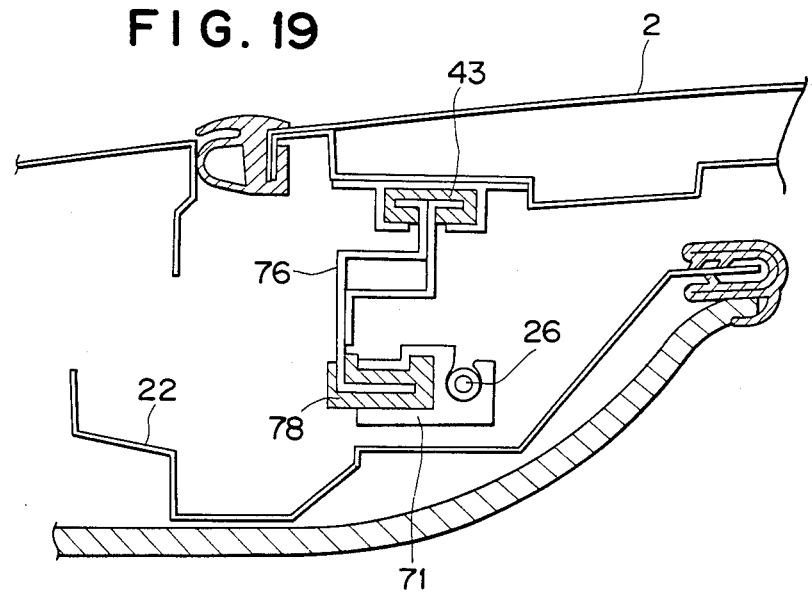

As shown in FIG. 18, in the main guide rail 71, at the transversely inward side of the guide portion 72, there is formed a guide slot 85 for slidingly guiding a drive cable 26 similarly to the first embodiment, the drive cable 26 being fixed at the end thereof to a support piece 86 projected from either side of the front stay 74, thereby permitting the panel 2 to be longitudinally moved with the drive cable 26.

The front stay 74 is arranged such that, in a state in which the roof opening 4 is closed with the panel 2 as shown in FIG. 15, lower end part 88 comes under a front fixed roof 15 of the vehicle and slider 75 faces the front end part of the main guide rail and, when the panel 2 is moved over rear fixed roof 6 of the vehicle as shown in FIG. 17, the slider 75 is brought near the rear end part of the main guide rail 71.

Moreover, the main guide rail 71, roof slide sub-guide rail 31 and sliders 43, 77, 78 are arranged such that the rear stay 76 is longitudinally movable with the longitudinal movement of the panel 2. The sliders 77, 78 fixed to the lower end of the rear stay 76 are adapted so as to be located, in the state in which the roof opening 4 is closed with the panel 2, substantially at the intermediate part of the main guide rail 71. In the state in which the panel 2 is moved over the rear fixed roof 6, the rear stay 76 has its rearward extension 89 positioned over the rear fixed roof 6 and the lower rear slider 78 faces the rear end part of the main guide rail 71.

With respect to the first embodiment of the invention, the foregoing third embodiment thereof; is similar in that, with the rearward movement of the panel 2, the rear stay 76 moves rearwardly guidedly with the main guide rail 71 while being gradually inclined and, in the fully opened state of the roof opening 4, becomes substantially horizontal, thus rendering small the angle the panel 2 makes with the rear fixed roof 6, and the panel 2 is firmly supported at the front end part thereof and the intermediate part thereof with the front stay 74 and the rear stay 76, respectively. The third embodiment is distinctive in that no more than the main guide rail 71 is provided a frame side guide rail, thus effecting the simplification such as in the manufacture and assembly work and favorably shortening the transverse width of the sliding roof devices disposed on both sides of the roof opening 4, thereby rendering such devices compact and enabling the opening size to be increased.

In the third embodiment of the invention, as the panel 2 slides over the rear fixed roof 6, the distance between the front stay 74 and the rear stay 76 becomes smaller. Therefore, the inclination of the panel 2 relative to the rear fixed roof 6 will be kept small even in a modified example, in which the main guide rail 71 may be straight, provided that the front stay 74 has a height greater than that of the rear stay 76.

Referring now to FIGS. 20 to 24 showing the sliding roof according to a fourth embodiment of the invention, a pair of main guide rails 91 arcuately formed to be slightly convexed upwardly are arranged on a roof frame 22 so as to extend at both sides of a roof opening 4 from the front part of the roof opening 4 to the rear part thereof and adapted to be swingable with a tilt-up mechanism 36, thus eliminating frame side sub-guide rails, while in these points the fourth embodiment is different from the first embodiment.

Each main guide rail 91 has a guide portion 94 shaped in its section in the form of a channel defining a slot 95 directed transversely outwardly of the vehicle, in which guide portion 94 a slider 16 fixed to the lower end of a front stay 74 is fitted slidably and rotatably for a predetermined angle range.

Figure 23:
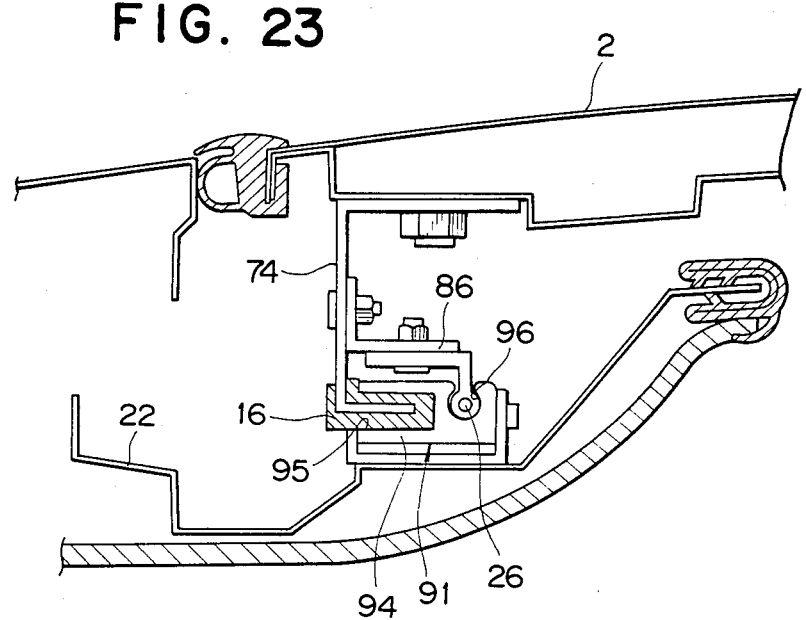
FIGS. 23 and 24 are sectional views taken along lines XXIII—XXIII and XXIV—XXIV of FIG. 20, respectively.

As shown in FIG. 23, in the main guide rail 91, at the transversely inward side of the guide portion 94, there is formed a guide slot 96 for slidingly guiding a drive cable 26 similarly to the first embodiment, the drive cable 26 being fixed at the end thereof to a support piece 86 projected from either side of the front stay 74, thereby permitting the panel 2 to be longitudinally moved with the drive cable 26.

Figure 24:
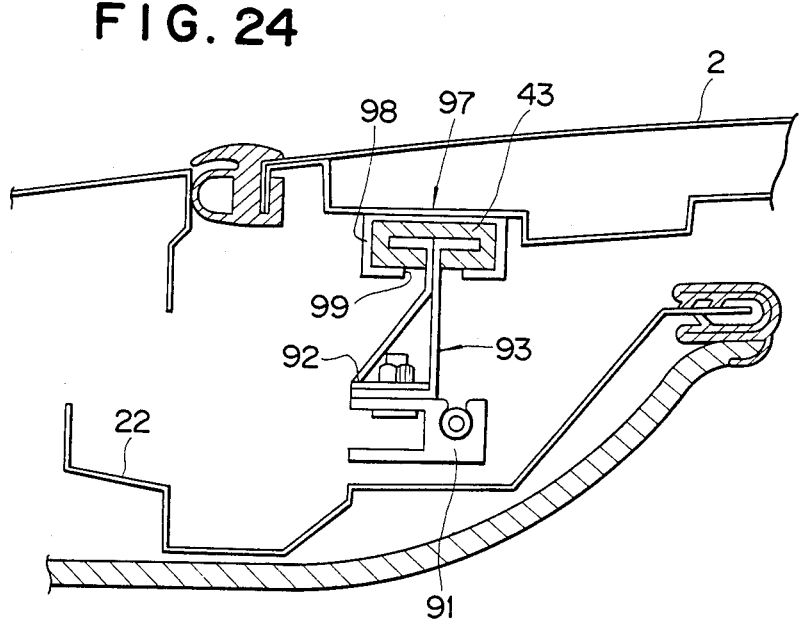

The rear stay 93 is fixed at its lower end 92 to the rear end part of the main guide rail 91 and provided at the upper end thereof with a slider 43 which is slidably fitted in a guide portion 98 of a roof side sub-guide rail 97 as shown in FIG. 24.

In this fourth embodiment in which the lower end 92 of the rear stay 93 is fixed, the roof side sub-guide rail 97 is arranged so as to extend at either side of the underside surface of the panel 2 substantially from the front part to the rear part thereof and the guide portion 98 is formed therein with a slot 99 opened downwardly.

The slider 43 fixed to the upper end of the rear stay 93 is adapted so as to be located, in a state in which the roof opening 4 is closed with the panel 2 as shown in FIG. 20, at the rear end part of the roof side sub-guide rail 97 and, in a state in which the panel 2 is moved over a rear fixed roof 6 of the vehicle as shown in FIG. 22, at the front end part of the roof side sub-guide rail 97.

In the above fourth embodiment, in which the slider 43 fixed to the upper end of the rear stay 93 is adapted only to slide, in the original position, along the guide slot 99 of the roof side sub-guide rail 97, the front stay 74, which has its height h predetermined to be greater than a height h' of the rear stay 93, causes the panel 2 to be rearwardly inclined as the front stay 74 moves rearwardly along the configuration of the main guide rail 91 or as it approaches the rear stay 93, thus rendering small the angle the panel 2 makes with the rear fixed roof 6 in the fully opened state of the panel 2. Such effects are substantially similar to those of the first embodiment. In addition thereto, in the fourth embodiment, similarly to the third embodiment, no more than the main guide rail 91 is provided as frame side guide rails and the rear stay 93 has a simplified structure, thus more favorably effecting the simplification such as in the manufacture and assembly work.

As will be apparent from the foregoing description, with a sliding roof for vehicles according to the invention, in which a frame side guide rail is formed so as to cause, when opening a roof opening, a panel to incline rearwardly as it moves rearwardly or, between front and rear stays, the height relation is selectively and properly predetermined so as to render small the inclination of the panel, as the roof opening is opened, relative to a rear fixed roof of the vehicle, there are provided favorable advantages such as structural simplification, cost reduction, reduction of the extent of projection of mechanical portions into the passenger area, and firm and strong supporting of the panel.

We claim:

1. A sliding roof for vehicles of the type in which a slidable panel slides outwardly and rearwardly of a roof opening, comprising:
   a panel for closing a roof opening;
   a roof frame defining said roof opening;
   guide means for guiding said panel slidably in the longitudinal direction of the vehicle body;
   an actuator for actuating said panel;
   a front stay and a rear stay both slidably supporting said panel through said guide means;
   tilt-up means for tilting up said panel at a rear end thereof;
   said tilt-up means being provided near a rear end of said roof opening on said roof frame;
   said guide means having a first guide rail means provided on said roof frame and a second guide rail means provided on said panel;
   said front stay being slidably connected to a portion of said first guide rail means;
   said rear stay being operatively connected between said first and said second guide rail means so as to be slidable relative to at least one thereof; and
   said front stay, said rear stay and said first and second guide rail means being formed such that, as said front stay approaches said rear stay with said panel caused to move rearwardly of the vehicle body, said front stay is raised from an initial position thereof and an uppermost portion of said front stay supporting said panel is raised relative to an uppermost portion of said rear stay supporting said panel.

2. A sliding roof according to claim 1, wherein:
   said front stay is taller than said rear stay when said panel is in an open position thereof.

3. A sliding roof according to claim 1, wherein: said rear stay is formed to extend in the longitudinal direction of the vehicle body between said first and said second guide rail means and, in the fully opened state of said roof opening, projects rearwardly from said roof opening so as to be located over a rear fixed roof of the vehicle.

4. A sliding roof according to claim 1, wherein:
   said first guide rail means comprises a rail fixedly attached on said roof frame and a swingable rail pivotably supported at the front end part thereof on said roof frame and at the rear end part thereof vertically movable with said tilt-up means, said swingable rail being disposed between an intermediate part of said roof opening and the rear end of said roof opening;
   said front stay is slidable on said fixed rail of said first guide rail means;
   said second guide rail means comprise a rail fixedly attached to the underside surface of said panel; and
   said rear stay is slidable between said swingable rail of said first guide rail means and said fixed rail of said second guide rail means.

5. A sliding roof according to claim 4, wherein: said swingable rail of said first guide rail means is upwardly arcuate; and said rear stay is slidably engaged with said swingable rail of said first guide rail means at two points spaced from each other in the longitudinal direction of the vehicle body.

6. A sliding roof according to claim 4, wherein: said fixed rail of said first guide rail means is disposed along substantially the whole length of said roof opening in the longitudinal direction of the vehicle body; and said front stay is slidable on said fixed rail of said first guide rail means, while being fixed to said panel.

7. A sliding roof according to claim 6, wherein: said fixed rail of said first guide rail means is inclined, with the rear part thereof located at a higher level than the front part thereof.

8. A sliding roof according to claim 4, wherein:

said fixed rail of said first guide rail means is disposed substantially between the front end of said roof opening and the intermediate part thereof;

said panel is provided on the underside surface thereof with a third guide rail means comprising a fixed rail disposed substantially between the front end of the panel and the longitudinally intermediate part thereof when the panel is in a closed position; and said front stay is slidable between said fixed rail of said first guide rail means and said fixed rail of said third guide rail means.

9. A sliding roof according to claim 1, wherein: said first guide rail means comprises a swingable rail pivotably supported at the front end part thereof on said roof frame, vertically movably supported at the rear end part thereof with said tilt-up means and disposed to extend along substantially the whole length of said roof opening in the longitudinal direction of the vehicle body.

10. A sliding roof according to claim 9, wherein: said swingable rail of said first guide rail means is upwardly arcuate; and said rear stay is slidably engaged with said swingable rail of said first guide rail means at two points spaced from each other in the longitudinal direction of the vehicle body.

11. A sliding roof according to claim 9, wherein:
said front stay has a height greater than that of said rear stay; and
said rear stay is fixed to said swingable rail of said first guide rail means and slidable relative to said second guide rail means.

12. A sliding roof according to claim 6, wherein:
said fixed rail of said second guide rail means is disposed so as to extend between the intermediate part and the rear end of said roof opening when said panel is in a closed position.

13. A sliding roof according to claim 10, wherein:
said second guide rail means comprises a rail fixedly attached to the underside surface of said panel;
said fixed rail of said second guide rail means is disposed so as to extend between an intermediate part and the rear end of said roof opening when the panel is in a closed position; and
said rear stay is slidably engaged with said fixed rail of said second guide rail means.

14. A sliding roof according to claim 11, wherein:
said second guide rail means comprises a rail fixedly attached to the underside surface of said panel, said fixed rail of said second guide rail means being disposed so as to extend substantially the entire length of said roof opening in the longitudinal direction of the vehicle body when the panel is in a closed position.

15. A sliding roof for vehicles of the type in which a slidable panel slides outwardly and rearwardly of a roof opening, comprising:
a panel for closing a roof opening;
a roof frame defining said roof opening;
guide means for guiding said panel slidably in the longitudinal direction of the vehicle body;
said guide means being provided on said roof frame;
an actuator for actuating said panel;
a front stay and a rear stay both slidably supporting said panel through said guide means;
tilt-up means for tilting up said panel at a rear end thereof;
said tilt-up means being provided near a rear end of said roof opening on said roof frame;
an engaging means provided on said panel for engagement with said rear stay;
said front stay being slidably connected to a portion of said guide means;
said rear stay being operatively connected between said guide means and said engaging means; and
said front stay, said rear stay and said guide means being formed such that, as said front stay approaches said rear stay with said panel caused to move rearwardly of the vehicle body, said front stay is raised from an initial position thereof and an uppermost portion of said front stay supporting said panel is raised relative to an uppermost portion of said rear stay supporting said panel.

16. A sliding roof for vehicles of the type in which a slidable panel slides outwardly and rearwardly of a roof opening, comprising:
a panel for closing a roof opening;
a roof frame defining said roof opening;
guide means for guiding said panel slidably in the longitudinal direction of the vehicle body;
an actuator for actuating said panel;
a front stay and a rear stay both slidably supporting said panel through said guide means;
tilt-up means for tilting up said panel at the rear end thereof;
means for causing a forward portion of said panel to be raised relative to a rearward portion of said panel as said panel moves rearwardly of the vehicle body along said guide means to thereby open said roof opening, while said panel is tilted up at the rear end thereof;
said guide means having rail means supported on said roof frame;
said panel raising means comprises an arcuately convexed portion of said rail means and said rear stay, said rear stay having a rear end operatively connected to an intermediate portion, in the longitudinal direction of the vehicle body, of said panel and a front end slidably connected to said arcuately convexed portion of said rail means at at least two points spaced from each other in the longitudinal direction of said rail means such that as said panel moves rearwardly of the vehicle body, said rear stay projects said rear end thereof rearwardly from the rear end of said roof opening.

* * * * *

UNITED STATES PATENT AND TRADEMARK OFFICE
CERTIFICATE OF CORRECTION

PATENT NO. : 4,730,868

DATED : March 15, 1988

INVENTOR(S) : Toshiaki NIWA

It is certified that error appears in the above-identified patent and that said Letters Patent is hereby corrected as shown below:

```
Column 2, line 56, change "view" to --views--.
Column 3, line 23, after "roof 1" insert --is--.
Column 6, line 18, delete "this"
Column 7, line 68, change "with" to --when--.
Column 8, line 43, after "provided" insert --as--.
```

Signed and Sealed this

Nineteenth Day of July, 1988

Attest:

DONALD J. QUIGG

*Attesting Officer*                *Commissioner of Patents and Trademarks*